UNITED STATES PATENT OFFICE.

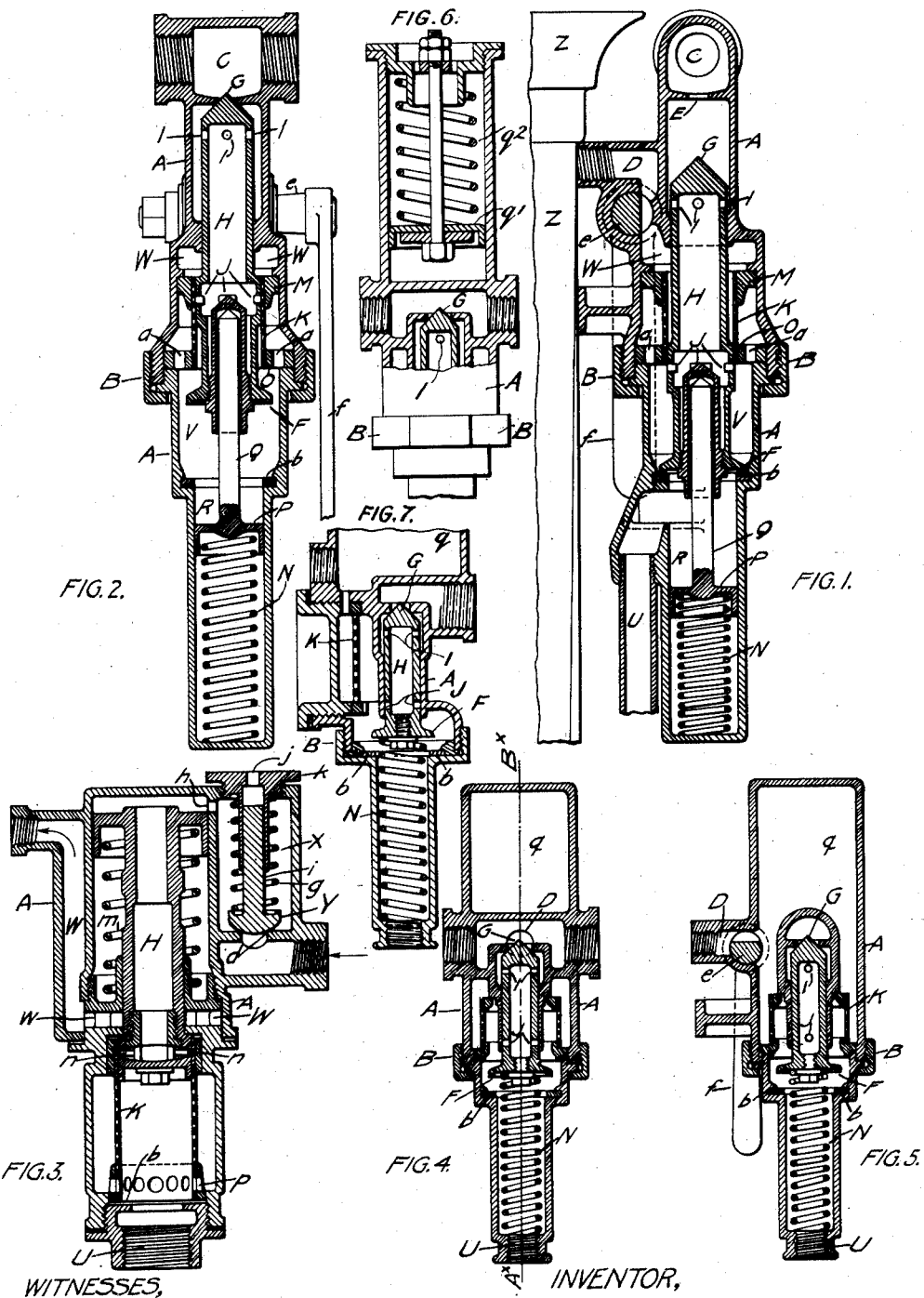

JOHN TAYLOR, OF MANCHESTER, ENGLAND.

HUMIDIFYING APPARATUS.

No. 864,810.　　　　　Specification of Letters Patent.　　　　Patented Sept. 3, 1907.

Application filed February 3, 1905. Serial No. 243,993.

*To all whom it may concern:*

Be it known that I, JOHN TAYLOR, managing director of the firm of Mather and Platt, Limited, of Park Works, Manchester, in the county of Lancaster, engineers, a subject of England, residing at Park Works, Manchester, in the county of Lancaster, England, have invented certain new and useful Improvements in or Relating to Humidifying Apparatus, of which the following is a specification.

The invention relates more particularly to humidifying apparatus for moistening or saturating the air in mills, factories, and other buildings, but may be employed in connection with any other water distributing device in connection with which a strainer or filter is employed. When such humidifying apparatus is provided with a strainer or filter through which the water passes on its way to the humidifier proper, such strainer or filter soon becomes covered with fluff, dirt, and other deleterious matter, which requires to be removed at frequent intervals. This makes necessary a frequent cleaning of the filters by an attendant, and also involves the removal of the strainers for the purpose of cleansing the same of the deleterious matter accumulated thereon.

The object of the present invention is to provide means for automatically cleaning the strainers or filters, and to that end the primary feature of invention consists in automatically and temporarily reversing the flow of water through the strainer or filter to remove the deleterious matter accumulated thereon.

A further feature of invention consists in the employment of a hollow piston or plunger forming a conduit for the passage of the water and serving also to control the flow of the water through the strainer or filter and the direction thereof.

A further feature of invention consists in the employment of compressed air, or its equivalent a spring-pressed plunger, for suddenly forcing the water through the filter in the reverse direction when the water-pressure is reduced.

The invention further consists in features of construction and arrangements of parts hereinafter described and claimed.

Referring to the drawings, Figure 1 is a section of an apparatus embodying my invention, the parts being in the position which they occupy when the humidifier is in operation; Fig. 2 is a similar section of the apparatus showing the parts in the position which they occupy when the humidifier is not in operation; Fig. 3 is a section of a modified form of the apparatus embodying an auxiliary chamber; Fig. 4 is a section of another modified form of apparatus embodying a compressed air chamber; Fig. 5 is a section on the line A× B× of of Fig. 4; Fig. 6 is a section of an apparatus corresponding to that shown in Figs. 4 and 5, but embodying a spring-pressed piston working in a cylinder in lieu of the compressed air chamber the lower end of the chamber R being broken away; and Fig. 7 is a section of an apparatus corresponding to that shown in Figs. 4 and 5, but provided with a flat strainer or filter instead of one of cylindrical form, the top of the chamber q being broken away.

Referring first to the construction shown in Figs. 1 and 2, A represents the body or casing of the filter attachment, said casing being preferably made in two parts joined together as at B. The filter attachment is connected to the humidifier Z and the outlet D leads to the spraying jet located in said humidifier. Said filter attachment is also connected to a feed-water pipe in communication with the inlet chamber C. A port or opening E leads from the inlet chamber C into the main body of the casing A, said port or opening being adapted to be closed by the end G of the hollow piston or plunger H, which constitutes a valve for that purpose, said valve G thus controlling the admission of water to the casing A. This valve G is preferably made of conical form for a purpose to be hereinafter described. The lower end of the hollow plunger H is provided with or constitutes a valve F adapted to seat upon the seat b for controlling the flow of the waste water from the filter casing. The hollow plunger G is provided near its upper end with a series of ports or openings I through which the water may flow to the interior of said hollow plunger, and is provided near its lower end with a second series of ports or openings J through which the water may flow from the interior of said hollow plunger, said hollow plunger constituting a conduit for the water from the ports I to the ports J. K is the strainer or filter, which is cylindrical in form and is suitably supported in the supports M and O in position to surround the hollow plunger H, which plunger, or an enlarged portion thereof, has a sliding fit within said filter. The filter K is so located with respect to the ports J that when the plunger H is in its lower position said ports J will be below the lower end of the filter, as shown in Fig. 1, and when said plunger is in its upper position the ports J will be in the position shown in Fig. 2, said ports J being moved from one position to the other as the hollow plunger H is moved in one direction or the other. V is a chamber with which the ports J communicate when in their lower position, and leading from this chamber V are ports a communicating with the chamber W, which chamber W in turn communicates through the valve e with the outlet D leading to the humidifier. A spring N is arranged to act on the hollow-plunger H to move the same in the direction to close the valve G, the tension of said spring N being regulated so as to close said valve G whenever the water pressure on said valve falls below a predetermined point. The spring N is located in a chamber R and bears against a plunger P provided with a rod Q which in turn bears against or acts upon the hollow plunger H. A waste-pipe U leads from the chamber below the outlet-valve F.

The operation of the apparatus above described is as follows: Assuming the parts to be in the position shown in Fig. 2, being the position which they occupy when the water is shut off and the humidifier is out of operation, the pump is started or the water otherwise supplied under pressure to operate the humidifier. When the pressure in the inlet chamber C has reached the predetermined point, that is, has become sufficient to overcome the spring N, such pressure acting on the valve G will serve to open said valve, and as soon as the valve has been moved away from its seat the water pressure, acting upon the enlarged area of the conical valve G, will serve to quickly and forcibly move the hollow plunger H downward against the action of the spring N. The water, when thus admitted through the port E by the opening of the valve G, flows through the ports I into the interior of the hollow plunger H, and the water thus admitted to the interior of the plunger will, as said plunger is moved downward, be forcibly ejected through the ports J against the filter K, and through said filter from the inside to the outside thereof, thereby washing away the fluff, dirt, and other deleterious matter accumulated upon the outside of said filter and thoroughly cleansing the same. The water which is thus forced through the filter with the fluff, dirt, etc. removed from the filter will then flow downward through the ports a into the chamber V, past the valve F and out through the waste-pipe U, the outlet valve F being at this time open. When, however, the hollow plunger H reaches its lower position the ports J will be brought to a position below the filter K, and the valve F and the escape through the waste-pipe U will be closed. With the parts in this position the water will flow through the ports J into the chamber V, thence upward through the ports a, through the filter K from the outside to the inside and into the chamber W, and thence through the valve e and port D to the nozzle of the humidifier. When now the pump is stopped or the water pressure reduced to a point where the spring N will overcome the pressure of the water on the valve G, said spring will serve to move the hollow plunger H upward, thereby moving the ports J upward through the filter, opening the outlet valve F and finally closing the valve G. As the ports J are thus moved upward through the filter, the effluent water will flow through said ports and through the filter from the inside to the outside, and thence downward through the ports a into the chamber V, past the valve F and out through the waste-pipe U, thereby again cleaning the filter.

In the modified construction shown in Fig. 3, an auxiliary chamber X is employed, and the water from the supply pipe enters said auxiliary chamber through the port d controlled by the valve Y. This valve Y is normally held closed by a spring g which surrounds the valve stem and abuts against the screw-cap k, and said valve is automatically opened by the water pressure when said pressure has become sufficient to overcome the spring g. The upper end of the valve-stem is open to the atmosphere through the opening j. H is a hollow piston or plunger which performs the same functions as the corresponding piston or plunger in the arrangement of Figs. 1 and 2. A port h leads from the auxiliary chamber X to the interior of the main casing A at a point above the hollow plunger H, which in this case is provided with a piston-head which fits the cylindrical casing. A spring m surrounds the plunger H and acts to hold said plunger in its upper position. The upper end of the plunger is open, and so that water entering the casing through the port h will flow into and through the hollow plunger, which constitutes a conduit for the same, and thence out through the lateral ports n at the lower end of the plunger. The cylindrical strainer or filter k is properly supported in the lower portion of the main casing, and at the lower end of said filter are a series of ports or openings p, and below the same is the waste-outlet U. A chamber W communicates with the port which leads to the humidifier.

The operation of the arrangement shown in Fig. 3 is substantially the same as that shown in Figs. 1 and 2. With the water shut off the parts are in the position shown. When the water is turned on and when the pressure has reached the predetermined point to overcome the spring g, the valve Y will be opened by the pressure, the enlarged area of the valve to which the pressure has access when the valve has been moved away from its seat causing the valve to be quickly opened and the pressure admitted to the main casing to act upon the head of the hollow plunger H and force the same downward against the action of the spring m. The water enters the upper open end of the hollow plunger and as said plunger moves downward and the ports n are moved down through the filter, the water ejected through said ports n is forced through the filter from the inside to the outside, thereby removing from the filter the fluff, dirt, and deleterious matter accumulated on the outside thereof, and the fluff, dirt, etc. thus removed are carried away with the water through the ports p and the waste outlet U. When the hollow plunger reaches its lower position the valve on the lower end thereof closes the waste-outlet, and at the same time the ports n are brought in line with the ports p, and the water flowing through the hollow plunger and out through the ports n flows through the ports p into the surrounding chamber, thence through the filter from the outside to the inside and thence into and through the chamber W to the humidifier. When the water is shut off and the pressure reduced the spring m moves the hollow plunger upward to its original position, and as the ports n are moved upward through the filter K the effluent water flows from said ports through the filter from the inside to the outside, thereby again cleaning the filter, and thence out through the waste-outlet, which has been again opened by the upward movement of the plunger.

Referring now to the modified arrangement shown in Figs. 4 and 5, the characteristic feature of this arrangement consists in the employment of an air-chamber q, in which air is compressed by the inflowing water and held compressed thereby until the water pressure is reduced, when the compressed air will act to quickly and suddenly force the effluent water through the filter to cleanse the same. In this arrangement the filter is not automatically cleansed upon the increase of the water pressure, but only upon the reduction of such water pressure. The construction of this arrangement is otherwise substantially the same as that shown in Figs. 1 and 2, except that the hollow plunger does not have a sliding fit in the cylindrical filter, but in a surrounding tube carried by the main casing, and except further that the filter and the water passages are so arranged that the flow of the water through the filter is the reverse of that in the former arrangement. Thus in the arrangement of Figs. 4 and 5 the water in flowing to the humidifier flows through the filter from the inside to the outside, and in cleaning the filter the water flows through the same from the outside to the inside.

The operation of the arrangement shown in Figs. 4 and 5 is as follows: When the valve G is opened by the pressure of the water, the water flows through the ports I into and through the hollow plunger H, through the ports J, thence through the filter from the inside to the outside, and thence through the valve e and port D to the humidifier. At the same time the water enters the chamber q and compresses the air contained therein, the air being held compressed by the water pressure while the humidifier is in operation. By reason of the compression of the air in the chamber q and the consequent reduction of its volume, a certain quantity of water remains in the chamber q which constitutes a storage chamber therefor. Whenever the water pressure is reduced to a predetermined point the spring N acts to move the hollow plunger upward and so as to close the valve G and open the outlet valve F. By the opening of said outlet-valve and the consequent escape of the water, the water-pressure is reduced, whereupon the compressed air in the chamber q suddenly expands and by its expansion expels the stored up water from the chamber q and forces it at great speed through the filter from the outside to the inside, carrying away the fluff, dirt, etc. which may have accumulated upon the inside of the filter and thoroughly cleansing the same. The water with the fluff, dirt, etc. removed from the filter flows out through the outlet b and the waste-pipe U.

The provision of the compressed air-chamber with the storage of water therein and the employment of the compressed air to force this stored up water at a high speed through the filter constitute an important practical advantage in the operation of the apparatus, as will be readily understood.

The apparatus shown in Fig. 6 is of the same construction and has the same mode of operation as that shown in Figs. 4 and 5, except that, instead of making use of compressed air to force the stored up water through the filter, a spring-pressed piston or plunger $q'$ working in a cylinder $q^2$ is employed as an equivalent therefor, the cylinder $q^2$ below the piston serving as the storage chamber for the water.

The apparatus shown in Fig. 7 is substantially the same as that shown in Figs. 4 and 5, except that in place of a cylindrical strainer or filter surrounding the hollow plunger H, a flat strainer or filter located at one side of said plunger is employed, the casing and water passages being appropriately constructed and arranged, as shown in Fig. 7. The operation of this apparatus, as will readily be understood, is the same as that shown in Figs. 4 and 5, the compressed air in the chamber q acting, when the water pressure is reduced, to expel from said chamber the water stored therein and force it through the filter from left to right, as in the arrangement shown in Fig. 7.

In all the forms of apparatus above described, as will be seen, the direction of flow through the filter is controlled by the hollow plunger, and the movement of said hollow plunger to reverse the direction of flow is controlled by the water-pressure.

What I claim as my invention and desire to secure by Letters Patent is:

1. The combination, with a water-outlet, of a non-reversible strainer or filter through which the water passes to said outlet, and means controlled by the water-pressure for reversing the flow of the water through said strainer or filter to cleanse the same, substantially as described.

2. The combination, with a water-outlet, of a non-reversible strainer or filter through which the water passes to said outlet, and means operated by a variation of the water-pressure for reversing the flow of the water through said strainer or filter, substantially as described.

3. The combination, with a water-outlet, of a strainer or filter through which the water passes to said outlet, and a plunger controlled by the water-pressure for reversing the flow through said strainer or filter, substantially as described.

4. The combination, with a water-outlet, of a filter for the water flowing thereto, and a hollow plunger forming a conduit for the water and operating to control the flow of water through said filter, substantially as described.

5. The combination, with a water-distributing device, of a filter for the water flowing thereto, and a spring-pressed plunger for controlling the flow of water through said filter, said plunger being moved in one direction by the water-pressure and in the opposite direction by its spring, substantially as described.

6. The combination of a casing containing a filter, said casing being provided with an inlet from the supply pipe, an outlet, a second or waste-outlet, and a plunger provided with a valve for closing said inlet and with a second valve for closing said waste-outlet, said plunger being controlled by the water-pressure, substantially as described.

7. The combination of a casing containing a filter, said casing being provided with an inlet opening from the supply-pipe, and a plunger provided with a valve for closing said inlet, said valve having an area exposed to the water pressure when the valve is seated, and a larger area exposed to said pressure when the valve has moved away from its seat, substantially as described.

8. The combination of a filter, a hollow plunger forming a conduit for leading the water to said filter, said plunger being provided with inlet and outlet ports, and means controlled by the water-pressure for moving said plunger to change the position of said outlet port with relation to the filter, substantially as described.

9. The combination of a filter, a hollow plunger forming a conduit for leading the water to said filter, said plunger being provided with inlet and outlet ports, and means controlled by the water-pressure for moving said plunger and its outlet port lengthwise of said filter, substantially as described.

10. The combination of a filter, a hollow plunger forming a conduit for leading the water to said filter, said plunger being provided with inlet and outlet ports, and means controlled by the water-pressure for moving said plunger and outlet port with relation to said filter to change the direction of flow through said filter, substantially as described.

11. The combination of a casing, a filter contained therein, a pressure chamber, the pressure in which is controlled by the water pressure, and means for permitting the pressure in said pressure chamber to become effective to force water through said filter in a direction reverse to the normal flow therethrough, substantially as described.

12. The combination of a casing, a filter contained therein, a storage chamber in which water is stored under pressure, and means controlled by the water-pressure for permitting the water stored in said chamber to be discharged through the filter in a direction reverse to the normal flow therethrough, substantially as described.

In testimony whereof I have hereunto set my hand in presence of two subscribing witnesses.

JOHN TAYLOR.

Witnesses:
CHARLES FREDERICK JONES,
EDMUND CHADWICK.